J. G. HODGSON.
CAN LACQUERING OR COATING MACHINE.
APPLICATION FILED MAR. 19, 1908.
932,610.
Patented Aug. 31, 1909.
5 SHEETS—SHEET 3.
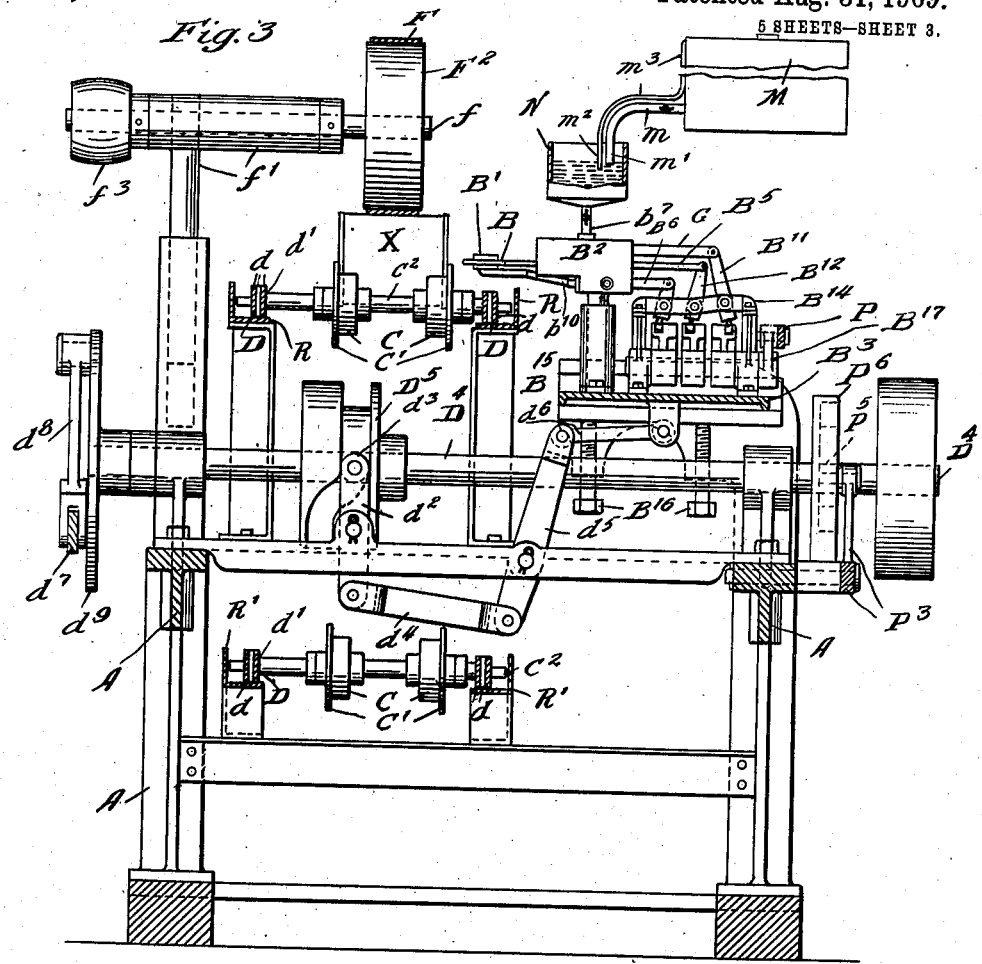
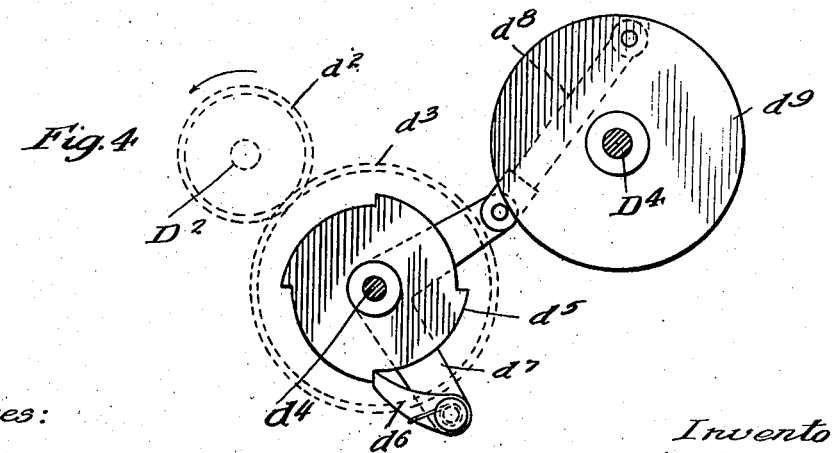
Witnesses:
Wm. Geiger
Pearl Abrams
Inventor:
John G. Hodgson
By Munday, Evarts, Adcock & Clarke
Attorneys J. G. HODGSON.
CAN LACQUERING OR COATING MACHINE.
APPLICATION FILED MAR. 19, 1908.

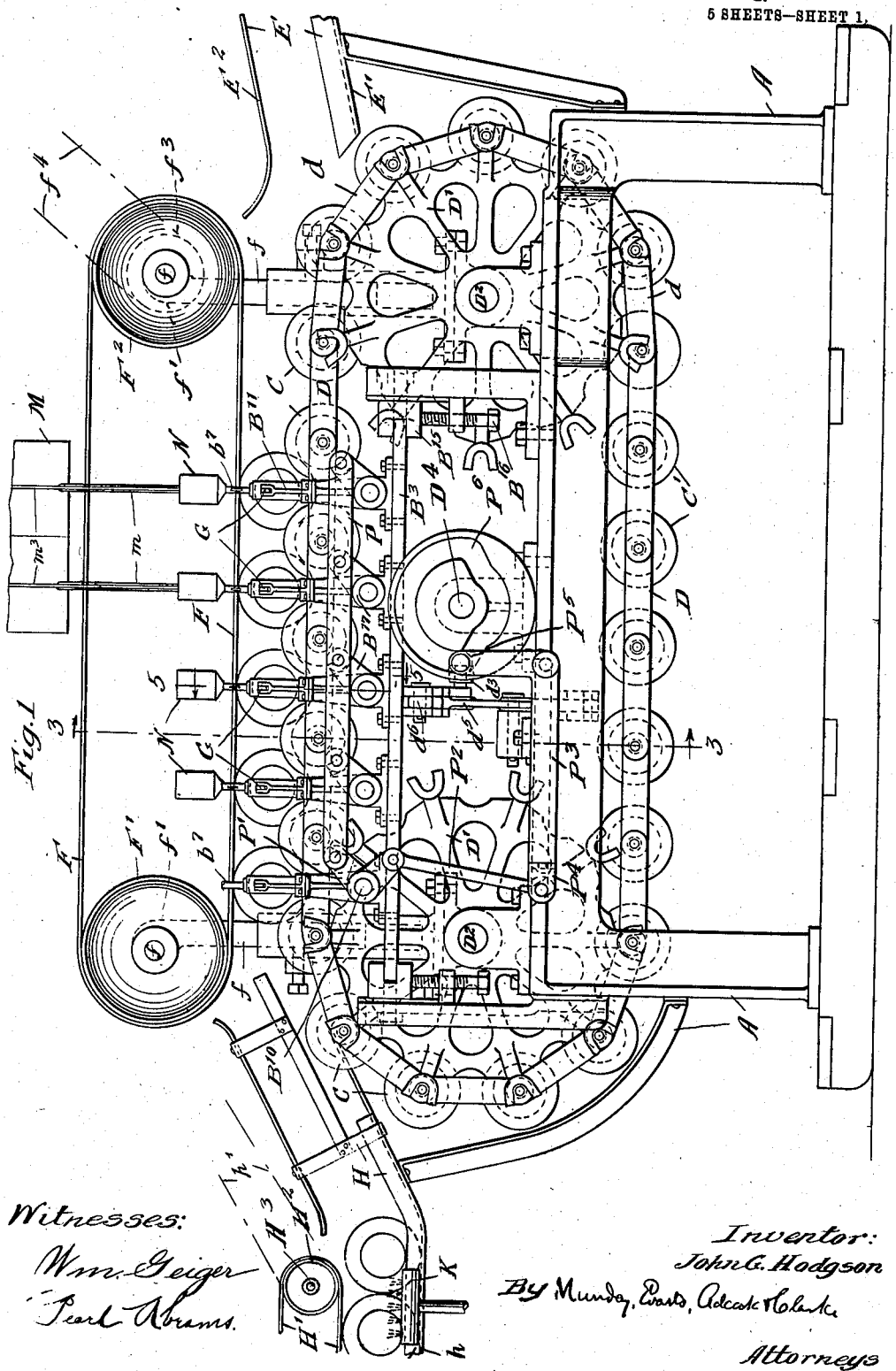

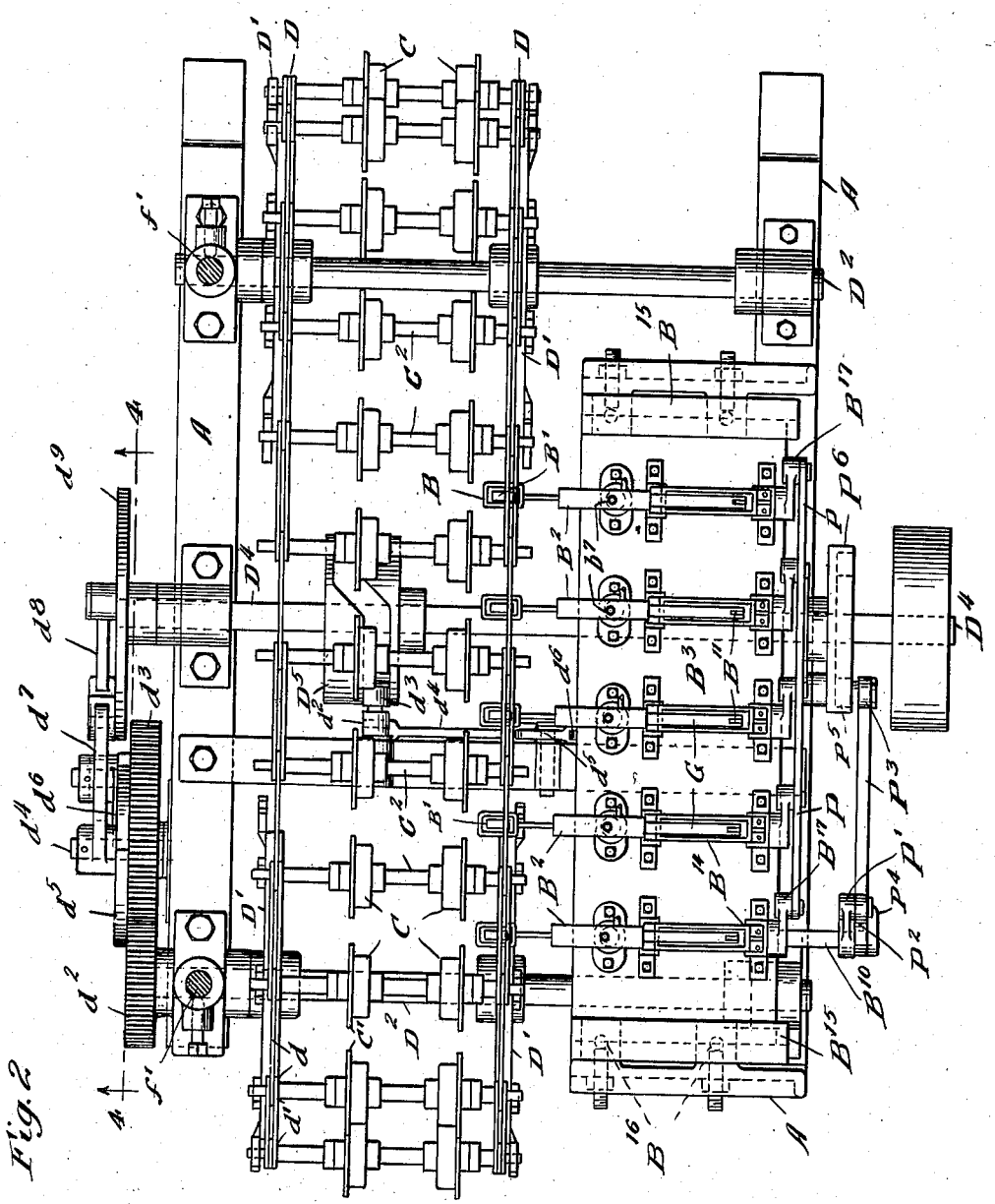

932,610.

Patented Aug. 31, 1909.
5 SHEETS—SHEET 4.

Witnesses:
Wm. Geiger
Pearl Adams.

Inventor:
John G. Hodgson
By Munday, Evarts, Adcock & Clarke,
Attorneys

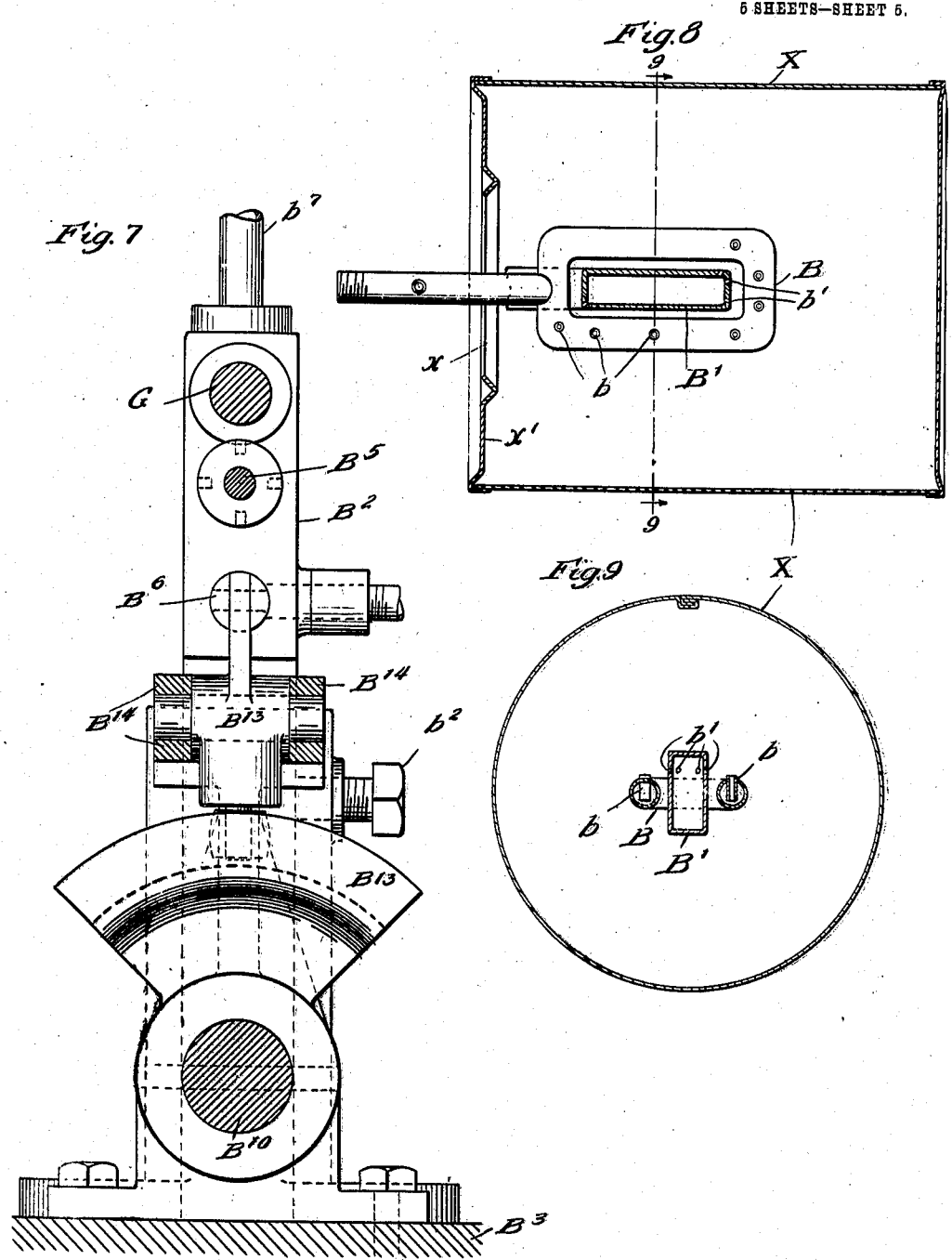

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

CAN LACQUERING OR COATING MACHINE.

932,610.     Specification of Letters Patent.     Patented Aug. 31, 1909.

Application filed March 19, 1908. Serial No. 421,967.

*To all whom it may concern:*

Be it known that I, JOHN G. HODGSON, a citizen of the United States, residing in Maywood, in the county of Cook and State of Illinois, have invented a new and useful Improvement in Can Lacquering or Coating Machines, of which the following is a specification.

My invention relates to improvements in machines for lining or coating the interior of cans with lacquer or other protective coatings.

The object of my invention is to provide a simple, efficient and durable machine for automatically coating the interior surface of sheet metal preserving cans with lacquer or other protective coating, and by which the work may be done rapidly and cheaply and the lining or coating rendered dry, hard, solid and firmly adherent, innocuous, tasteless, insoluble in vegetable or food acids or juices, and also capable of successfully withstanding without injury the heat of the cooking or processing step to which the cans are subjected after being filled and the heat of the soldering operation employed in soldering in place the caps that close the filling openings in the cans.

My invention consists in connection with an endless link chain can carrier, furnished with a plurality of can holders, preferably rotating rollers, combined with a gang or series of reciprocating spray heads adapted to enter and simultaneously spray a series of cans.

It further consists in connection with these elements, of a runway or device for automatically delivering the cans to the can holders, and a discharge runway for the freshly coated cans and a flashing or igniting device for flashing or igniting the inflammable vapors arising in and issuing from the freshly coated cans, and thus quickly drying and hardening and rendering firmly adherent and also innocuous and tasteless the lacquer or other protective coating applied by the spray heads to the interior surfaces of the cans.

It further consists in the novel construction of parts and devices and in the novel combinations of parts and devices herein shown and described.

Figure 5:
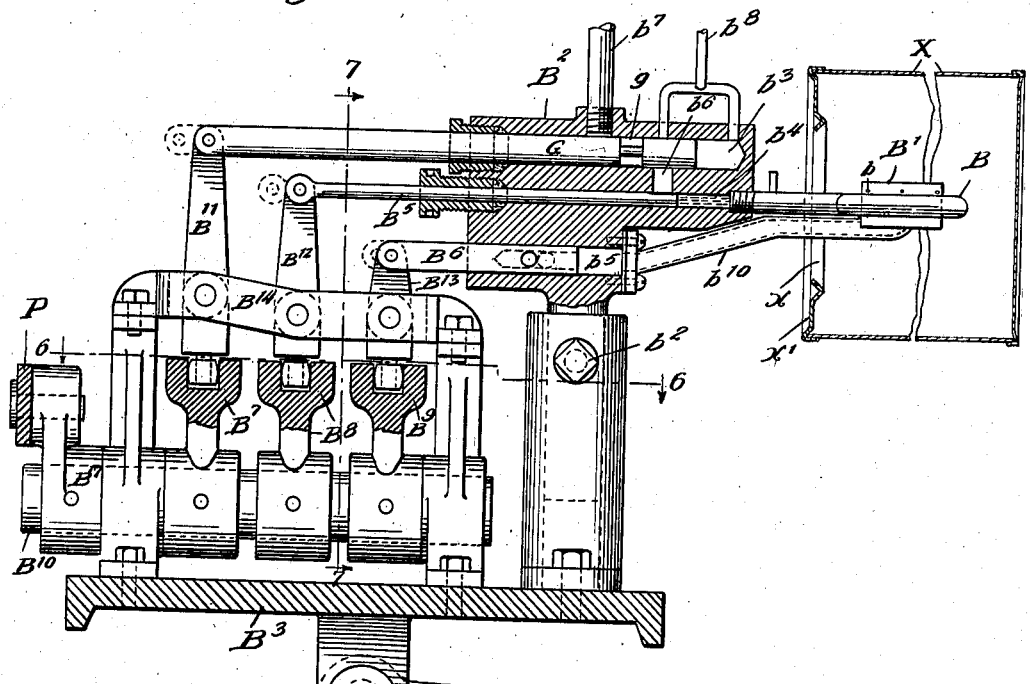
Figure 6:
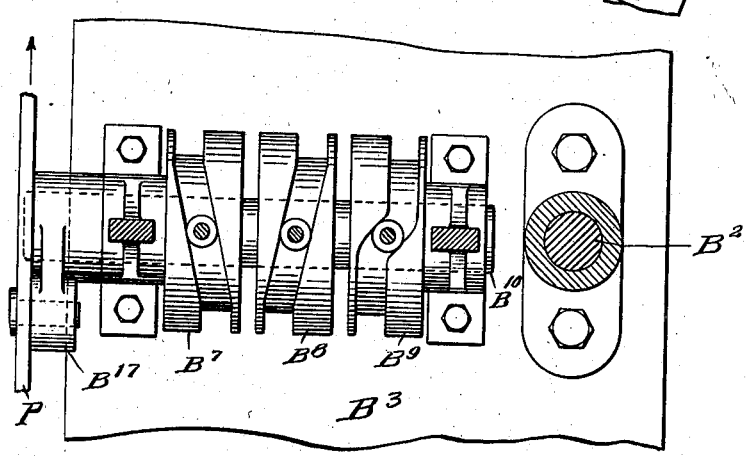

In the accompanying drawing forming a part of this specification, Figure 1 is a side elevation of a can lacquering or spraying machine embodying my invention. Fig. 2 is a plan view. Fig. 3 is a vertical cross section on line 3—3 of Fig. 1. Fig. 4 is a detail section on line 4—4 of Fig. 2. Fig. 5 is an enlarged detail section on line 5—5 of Fig. 1. Fig. 6 is a detail section on line 6—6 of Fig. 5. Fig. 7 is a detail section on line 7—7 of Fig. 5. Fig. 8 is a detail plan view partly in horizontal section of the spray head, showing also the can in section and Fig. 9 is a section on line 9—9 of Fig. 8.

In the drawing, A represents the frame of the machine, B the spray heads, C the can holders, D the endless flexible carrier or chain conveyer upon which the can holders are mounted, E the can feed runway or device for delivering the cans to the can holders, F the can rotating device, G the feed devices for the liquid lacquer or coating material, one for each spray head, H the discharge runway for the freshly coated cans, K a gas jet or flashing device for igniting the inflammable vapors arising from and issuing from the freshly coated cans, $H^1$ an endless belt or device for rolling the cans along the discharge runway past the igniting device, M N upper and lower tanks for containing and supplying the liquid lacquer or coating material to the feed plungers or devices.

The gang of simultaneously operated spray heads may contain any desired number of such heads, but in practice I prefer to employ a gang of five spray heads, all mounted upon the same transversely reciprocating slide so that five cans in the holders of the link chain can carrier may be simultaneously operated upon by the spraying devices. Each of the spray heads B is preferably of a looped pipe construction and of substantially rectangular form, surrounding its compressed air head $B^1$. As the spray heads are all preferably of the same construction, a description of one will suffice for them all. Each of the spray heads B is preferably furnished with a plurality of upwardly projecting nipples or nozzles $b$, the upper ends of which project slightly above the upper surface of the spray head B, and the lower ends of which extend to near the bottom of the spray head chamber, so that these nipples or nozzles may withdraw substantially all the lacquer or protective coating from the spray head B. The compressed air head $B^1$ is furnished with a series of jet orifices $b^1$ through which blasts of compressed air are directed over the upper end of the jet nipples or nozzles $b$ of the spray head. The spray head B is removably secured to the spray head holder $B^2$ which is adjustably secured by a clamp screw $b^2$ on the reciprocating slide $B^3$ by which the spray head is moved in and out of the can X through the filling opening $x$ in the head or end $x^1$ of the can. The spray head holder $B^2$ is furnished with a feed chamber $b^3$ for the feed plunger G and a further chamber $b^4$ for the compressing plunger $B^5$ by which the charge of liquid lacquer or coating material is forced into the spray head, and with a further chamber $b^5$ for the compressed air plunger $B^6$ by which the admission of compressed air to the compressed air head $B^1$ is controlled. The feed plunger G is furnished with a feed pocket $g$ of a size or capacity to deliver at each stroke of the feed plunger just enough liquid lacquer or other coating for one can, and the stroke of the compressing plunger is also regulated so as to force just the required charge of liquid lacquer or other coating material necessary for one can into each can. The plungers G, $B^5$ and $B^6$ are automatically reciprocated as required by means of cams $B^7$ $B^8$ $B^9$ on the rock shaft $B^{10}$ which is mounted on the slide $B^3$, and which cams operate said plungers through suitable connecting levers $B^{11}$ $B^{12}$ $B^{13}$ which are fulcrumed on the bar $B^{14}$, carried by the slide $B^3$. The liquid lacquer or coating material feeds down by gravity from the supplemental supply tank N into the feed chamber $b^3$ and the feed plunger pocket $g$ through the connecting pipe $b^7$. The spray head holder $B^2$ is also provided with a vent pipe $b^8$ to prevent air or other fluid being trapped in the end of the feed plunger chamber $b^3$. The spray head holder $B^3$ is further provided with a passage $b^2$ leading from the feed chamber $b^3$ to the compressing chamber $b^4$, through which passage the charge of liquid lacquer or coating material in the pocket $g$ of the feed plunger G flows down in front of the compressing plunger $B^5$ by which it is forced into the spray head. The compressed air chamber or cylinder $b^5$ of the spray head holder $B^2$ is connected by a pipe $b^{10}$ with the compressed air head $B^1$, the pipe $b^{10}$ being preferably made integral with said head as indicated in the drawing.

The can holder C may be of any suitable construction adapted to hold the can in coöperative relation with the spray head whether the can or the spray head be the member that is rotated. In that embodiment of my invention wherein the can is the member rotated, as illustrated in the drawing, the can holder is rotatable or of a construction adapted to permit the rotation of the can. The construction of the rotatable can holder C which I prefer to employ consists of a pair of rollers, each preferably furnished with flanges $C^1$ at each end to prevent longitudinal movement of the can in the holder as the spray head is being inserted and removed therefrom. A plurality or series of can holders C, each consisting of a pair of rotatable rollers is preferably employed, the same being mounted on the links $d$ of the intermittently movable link chain can carrier or conveyer D. The shafts $C^2$ of the can holder roller C are journaled in suitable holes or bearings $d^1$ in the links $d$ of the link chain carrier or conveyer D, and these shafts $C^2$ may preferably serve also as the pivotal connections between the ends of adjacent links $d$.

The link chain carrier D is mounted upon and operated by sprocket wheels $D^1$, the shafts $D^2$ of which are journaled on the frame of the machine. The link chain can carrier D may be intermittently operated with a step by step movement of sufficient extent to bring each successive group of five cans in the can holders C of the carrier D into registry with the gang of spray heads B by any suitable mechanism, the same consisting preferably of a gear $d^2$ on the shaft $D^2$ of one of the sprocket wheels which meshes with a gear $d^3$ on the shaft $d^4$ which is furnished with a ratchet $d^5$ and is operated by a pawl $d^6$ on the bent lever $d^7$ and which is connected by a link $d^8$ to a disk $d^9$ on the main driving shaft $D^4$.

The device E for delivering the cans to the can holders on the link chain carrier D automatically, preferably consists of an inclined runway having guide flanges $E^1$ and an upper guide rail $E^2$.

The means for simultaneously and automatically rotating the group of cans in the can holders of the link chain carrier which are simultaneously operated upon by the gang of spray heads may be of any suitable kind or construction. It, however, preferably consists of an endless flexible belt F, which engages the group of cans when the same are brought into register with the gang of spray heads B by movement of the can holder carrier D. The can rotating belt F is mounted upon a pair of pulleys $F^1$ $F^2$, the shafts $f$ of which are journaled in vertically adjustable bearings $f^1$ on the frame of the machine so that the can rotating belt may be adjusted up and down to accommodate cans of different diameters. The shaft $f$ of one of the pulleys F is furnished with a pulley $f^3$ to which motion is communicated by a belt $f^4$.

The liquid lacquer or coating material supply tank M is preferably a tight or hermetically closed tank, and it is furnished with a feed pipe $m$, the lower end $m^1$ of which projects into the supplemental open tank N above the lower end $m^2$ of the air or vent pipe $m^3$ which leads from the upper portion of the closed tank M into the open or supplemental tank N. The lower end $m^2$ of the vent pipe $m^3$ thus automatically controls, regulates or keeps uniform the height or level of the liquid lacquer or coating material in the open or supplemental tank N. When the liquid lacquer or coating material rises in the open or supplemental tank N high enough to seal the lower end $m^2$ of the vent pipe $m^3$, further flow of the liquid from the closed tank M into the open tank N is automatically stopped until the level of the liquid in the open tank N again falls below the lower end $m^2$ of the vent pipe $m^3$.

The discharge device H by which the freshly coated cans are discharged from the can holders and conveyed past the gas jet or igniting device K preferably consists of a runway, the inner end of which is preferably somewhat inclined. The rails of this runway have upright flanges $h$ to guide the cans as they roll along it. To insure proper movement of the cans along the runway, I prefer to provide it with an endless conveyer chain or belt $H^1$ mounted on pulleys $H^2$, the shafts $H^3$ of which are journaled in suitable bearings or supports on the frame of the machine. The shaft of one of these pulleys is preferably driven by a belt $h^1$.

To flash and sterilize the cans by fire, and also to quickly dry, harden and render firmly adherent the preservative coating applied on the inside thereof, and to free the same from vapors arising from the volatile and inflammable ingredients of the lacquer or preservative coating applied thereto and consequent injury to workmen or danger of fire, and also to eliminate from the interior coatings of the cans all taste, odor, or flavor that might otherwise exist from the coating, I mount adjacent to the can runway H a gas jet or other igniting device K so that as each can passes the gas jet on the runway the vapors in the can and issuing therefrom will be flashed, exploded and burnt.

To properly support the group of cans in the can holders so that they will correctly register with the gang of reciprocating spray heads, the main frame of the machine is provided with tracks or rails R upon which the links of the link chain can carrier D rests. To prevent sagging of the lower loop or member of the link chain can carrier, the frame of the machine is further provided with lower tracks or rails $R^1$.

The spray head slide $B^3$ reciprocates in suitable guides $B^{15}$ which are adjusted up and down on the frame of the machine to accommodate cans of different diameters by adjusting screws $B^{16}$. Said slide $B^3$ is reciprocated as required by means of a cam $D^5$ on the driving shaft $D^4$ through the lever $d^2$ carrying a roller $d^3$, and which is connected by a link $d^4$ with a lever $d^5$ which is connected by a link $d^6$ with said spray head slide $B^3$.

The rock shafts $B^{10}$ which carry the several cams $B^7$ $B^8$ $B^9$ that actuate the several plungers in the spray head holder, are automatically rocked at intervals by means of a reciprocating bar P on the arms $B^{17}$ of said rock shafts $B^{10}$, and which bar P is actuated by means of an arm $P^1$ connected by a link $P^2$ with a bent lever $P^3$ having a swivel joint $P^4$ at one end and which carries a roller $P^5$ traveling in the cam $P^6$ on the driving shaft $D^4$.

I claim:—

1. In an automatic machine for coating the interior of cans with lacquer or protective material, the combination with an endless flexible can carrier furnished with a plurality of rotatable can holders, a runway for delivering the cans to the holders, means for simultaneously axially rotating a group of cans in the holders, and a gang of reciprocating spray heads spaced relatively to said holders and adapted each to enter a can, substantially as specified.

2. In an automatic machine for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, each of said spray heads having a plurality of jets and a compressed air head having a plurality of orifices, substantially as specified.

3. In an automatic machine for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, each of said spray heads having a plurality of jets and a compressed air head having a plurality of orifices, a reciprocating holder for said spray heads furnished with a plurality of feed plungers, one for each spray head, substantially as specified.

4. In an automatic machine for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, each of said spray heads having a plurality of jets and a compressed air head having a plurality of orifices, a reciprocating holder for said spray heads furnished with a plurality of feed plungers, one for each spray head and with a plurality of compressing plungers, one for each spray head, substantially as specified.

5. In an automatic machine, for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, each of said spray heads having a plurality of jets and a compressed air head having a plurality of orifices, a reciprocating holder for said spray heads furnished with a plurality of feed plungers, one for each spray head and with a plurality of compressing plungers, one for each spray head, and a plurality of compressed air pistons, one for each spray head, substantially as specified.

6. In an automatic machine for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, a discharge runway and a flame device for flashing or igniting and sterilizing the freshly coated cans as they pass on the discharge runway, substantially as specified.

7. In an automatic machine for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, each of said spray heads having a plurality of jets and a compressed air head having a plurality of orifices, a reciprocating holder for said spray heads furnished with a plurality of feed plungers, one for each spray head and with a plurality of compressing plungers, one for each spray head, a discharge runway and a flame device for flashing or igniting and sterilizing the freshly coated cans as they pass on the discharge runway, substantially as specified.

8. In an automatic machine, for coating the interior of cans with lacquer or protective material, the combination with an endless flexible can carrier furnished with a plurality of rotatable can holders, a runway for delivering the cans to the holders, means for simultaneously rotating a group of cans in the holders, a gang of reciprocating spray heads adapted each to enter a can, each of said spray heads having a plurality of jets and a compressed air head having a plurality of orifices, a reciprocating holder for said spray heads furnished with a plurality of feed plungers, one for each spray head and with a plurality of compressing plungers, one for each spray head, and a plurality of compressed air pistons, one for each spray head, a discharge runway and a flame device for flashing or igniting and sterilizing the freshly coated cans as they pass on the discharge runway, substantially as specified.

9. In a spray can lacquering machine, the combination with an endless flexible can carrier furnished with a series of rotatable can holders, of a runway for delivering the cans to said holders, means for axially rotating the cans in the holders and a reciprocating spray head adapted to enter the rotating can, substantially as specified.

10. In a spray can lacquering machine, the combination with an endless flexible can carrier furnished with a series of rotatable can holders, of a runway for delivering the cans to said holders, means for axially rotating the cans in the holders and a reciprocating spray head adapted to enter the rotating can, and a discharge runway, substantially as specified.

11. In a spray can lacquering machine, the combination with an endless flexible can carrier furnished with a series of rotatable can holders, of a runway for delivering the cans to said holders, means for rotating the cans in the holders and a reciprocating spray head adapted to enter the rotating can, a discharge runway, a flame device for flashing and sterilizing the freshly lacquered cans, substantially as specified.

12. In a spray can lacquering machine, the combination with an endless flexible can carrier furnished with a series of rotatable can holders, of a runway for delivering the cans to said holders, means for rotating the cans in the holders and a reciprocating spray head adapted to enter the rotating can, a feed tank for the lacquer and a feed plunger therefor, substantially as specified.

13. In a spray can lacquering machine, the combination with an endless flexible can carrier furnished with a series of rotatable can holders, of a runway for delivering the cans to said holders, means for rotating the cans in the holders and a reciprocating spray head adapted to enter the rotating can, a feed tank for the lacquer and a feed plunger therefor, having a feed pocket for delivering the lacquer in a measured quantity necessary for each can at each stroke of said feed plunger, substantially as specified.

14. In a machine for lacquering or coating the interior of cans with lacquer or other protective coating, the combination with a reciprocating gang of spray heads, of means for axially rotating a series of cans while being operated upon by said spray heads, said spray heads being constructed and adapted to enter the cans and spaced relatively to said can holders, substantially as specified.

15. The combination with a gang of reciprocating spray heads, of a link chain can carrier furnished with a series of can holder rollers and a belt for axially rotating a group of cans in said holders, said spray heads being constructed and adapted to enter the cans and spaced relatively to said can holders, substantially as specified.

16. The combination with a gang of reciprocating spray heads, of a link chain can carrier furnished with a series of can holder rollers, and a belt for axially rotating a group of cans in said holders, and a can delivery runway, said spray heads being constructed and adapted to enter the cans and spaced relatively to said can holders, substantially as specified.

17. The combination with a gang of reciprocating spray heads, of a link chain can carrier furnished with a series of can holder rollers, a belt for axially rotating a group of cans in said holders, a can delivery runway and a can discharge runway, said spray heads being constructed and adapted to enter the cans and spaced relatively to said can holders, substantially as specified.

18. The combination with a gang of reciprocating spray heads, of a link chain can carrier furnished with a series of can holder rollers, a belt for rotating a group of cans in said holders, a can delivery runway, a can discharge runway, and a flame device for igniting and flashing and sterilizing the cans and drying and hardening the coating on the interior thereof, substantially as specified.

19. The combination with a gang of reciprocating spray heads, of a link chain can carrier furnished with a series of can holder rollers and a belt for rotating a group of cans in said holders, and a gang of feed plungers, one for each spray head, substantially as specified.

20. The combination with a gang of reciprocating spray heads, of a link chain can carrier furnished with a series of can holder rollers and a belt for rotating a group of cans in said holders, a gang of feed plungers, one for each spray head and a gang of compressing plungers, one for each spray head, substantially as specified.

21. The combination with a gang of reciprocating spray heads, of a link chain can carrier furnished with a series of can holder rollers and a belt for rotating a group of cans in said holders, a gang of feed plungers, one for each spray head and a gang of compressing plungers, one for each spray head and a gang of air pistons, one for each spray head, substantially as specified.

22. The combination with a gang of reciprocating spray heads, of a link chain can carrier furnished with a series of can holder rollers, and a belt for rotating a group of cans in said holders, a gang of feed plungers, one for each spray head, a gang of compressing plungers, one for each spray head, a gang of air pistons, one for each spray head and a feed tank for the liquid lacquer or coating material, substantially as specified.

23. The combination with a gang of reciprocating spray heads, of a link chain can carrier furnished with a series of can holder rollers, and a belt for rotating a group of cans in said holders, a gang of feed plungers, one for each spray head, a gang of compressing plungers, one for each spray head, a gang of air pistons, one for each spray head, a feed tank for the liquid lacquer or coating material and a closed supply tank, substantially as specified.

24. The combination with a gang of reciprocating spray heads, of a link chain can carrier furnished with a series of can holder rollers, and a belt for rotating a group of cans in said holders, a gang of feed plungers, one for each spray head, a gang of compressing plungers, one for each spray head, a gang of air pistons, one for each spray head, a feed tank for the liquid lacquer or coating material, a closed supply tank, a supply pipe connecting said feed tank with said supply tank and a vent pipe also connecting said tanks, the lower end of the supply pipe projecting below the lower end of the vent pipe, substantially as specified.

JOHN G. HODGSON.

Witnesses:
 PEARL ABRAMS,
 WILLIAM A. GEIGER.